(12) United States Patent
Chen et al.

(10) Patent No.: US 9,858,690 B2
(45) Date of Patent: Jan. 2, 2018

(54) COMPUTED TOMOGRAPHY (CT) IMAGE RECONSTRUCTION METHOD

(71) Applicant: NATIONAL YANG-MING UNIVERSITY, Taipei (TW)

(72) Inventors: Jyh-Cheng Chen, Taipei (TW); Shih-Chun Jin, Kaohsiung (TW)

(73) Assignee: National Yang-Ming University, Taipei (TW)

(*) Notice: Subject to any disclaimer, the term of this patent is extended or adjusted under 35 U.S.C. 154(b) by 896 days.

(21) Appl. No.: 14/285,045

(22) Filed: May 22, 2014

(65) Prior Publication Data
US 2015/0103968 A1 Apr. 16, 2015

(30) Foreign Application Priority Data
Oct. 11, 2013 (TW) .............................. 102136721 A

(51) Int. Cl.
*G06T 11/00* (2006.01)

(52) U.S. Cl.
CPC ....... *G06T 11/006* (2013.01); *G06T 2211/424* (2013.01)

(58) Field of Classification Search
CPC . G06T 11/006; G06T 2211/424; G06T 17/00; G06T 2200/08
See application file for complete search history.

(56) References Cited

U.S. PATENT DOCUMENTS

| 6,850,585 B2* | 2/2005 | Hsieh | A61B 6/481 378/15 |
| 2012/0098832 A1* | 4/2012 | Chartouni | G06T 17/00 345/426 |

FOREIGN PATENT DOCUMENTS

| WO | WO 1992/005507 A1 | 4/1992 |
| WO | WO 2004/015632 A1 | 2/2004 |
| WO | WO 2004/019279 A2 | 3/2004 |
| WO | WO 2004/067091 A1 | 8/2004 |
| WO | WO 2004/072904 A1 | 8/2004 |
| WO | WO 2004/072905 A1 | 8/2004 |
| WO | WO 2004/107269 A1 | 12/2004 |
| WO | WO 2005/093662 A1 | 10/2005 |
| WO | WO 2006/018793 A1 | 2/2006 |
| WO | WO 2008/024585 A1 | 2/2008 |
| WO | WO 2008/130325 A1 | 10/2008 |
| WO | WO 2010/028027 A1 | 3/2010 |
| WO | WO 2010/062956 A1 | 6/2010 |
| WO | WO 2010/109352 A1 | 9/2010 |
| WO | WO 2011/011684 A2 | 1/2011 |
| WO | WO 2011/100723 A2 | 8/2011 |

(Continued)

*Primary Examiner* — Dani Fox
(74) *Attorney, Agent, or Firm* — Muncy, Geissler, Olds & Lowe, P.C.

(57) ABSTRACT

The present invention discloses a computed tomography (CT) image reconstruction method using two-dimensional images at different angles as well as a two-dimensional virtual matrix on a basis of spherical space, to process projection, comparison, and correction. Thus, it can obtain the tomography within predetermined difference value to reduce computational and storage space. Matching the parameters of energy source and image capturing can further shorten energy radiation on an object's (i.e. a human body) exposure time, in order to reduce radiation effects of energy sources (i.e. as X-rays) of the object (i.e. as a human body).

7 Claims, 11 Drawing Sheets

(56) References Cited

FOREIGN PATENT DOCUMENTS

WO     WO 2011/148277 A2    12/2011
WO     WO 2012/055147 A1     5/2012

* cited by examiner

COMPUTED TOMOGRAPHY (CT) IMAGE RECONSTRUCTION METHOD

BACKGROUND OF THE INVENTION

Field of the Invention

The present invention relates to a computed tomography (CT) image reconstruction methods, particularly referring to a system through a two-dimensional matrix for projection, comparison, back-projection and corrections to reduce the amount of computational and storage space.

Brief Discussion of the Related Art

Currently, CT image reconstruction system uses matrix in the reconstruction. It has been widely used in general iterative reconstruction method. However, with advanced technology in computer and image acquisition, the higher resolution the imaging detector, the larger information obtained, which requires a larger computing and storage resources. Although some instrument company may use connected multiple imaging workstations in series to achieve the operational purpose, technically, it still needs a large computing memory storage capacity for amount of these image data.

Please refer to U.S. Pat. No. 6,850,585 B2 and No. US20120098832, which disclose a multi-angle three-dimensional image reconstruction method using two-dimensional imaging. A detector system scans an object and causes at least one ray passing through the object, then uses the measured value for image reconstruction. The image reconstruction method comprises the following steps: first, use a plurality of voxels comprising a value of the three-dimensional image for the observed object to establish a reconstruction space. Then, project along the direction of the rays and compare the measured value for obtaining a correction value. Next, according to the correction value and each three-dimensional voxel value along the same tracing line but inversed, proceed back-projection. Finally, according to the correction value and the value of each three-dimensional voxel with respect to their corresponding relationship, obtain the modified correction value and update value after replacing the original value. Depending on users' needs, repeat several times iteratively for imaging reconstruction. The described technique above is based on iteration of each image for three-dimensional imaging, which has higher computational complexity.

SUMMARY OF THE INVENTION

The purpose of the present invention is to provide a computed tomography image reconstruction method taking advantage of two-dimensional images with different angles and a two-dimensional virtual matrix. Use a spherical space to process projection, comparison, and correction, further to obtain within a predetermined difference value tomography output, thereby reducing the required amount of computation and storage space.

In order to achieve the above purpose, the present invention provides a computed tomography image reconstruction method comprising the steps of:

Step 1: Gather information—collecting all the different directions corresponding to a projection of the data by using a center line, between central of detector and ray source, when an imaging system goes around an object every predetermined angle, and the data are recorded as geometric parameters of the imaging projection system; then the directions of the geometric parameters of the system are created as a set of three-dimensional spatial image reconstruction information.

Step 2: Projection—building the imaging virtual data model and simplify its three-dimensional characteristics into a simplified data model, and virtualize a set of data in a region of interest (ROI) as a forecast data, and finally input the data of the region of interest (ROI) into the simplified data model to simulate the projection.

Step 3: Comparison—comparing and matching the simulation projection with the collected information at each angle of the projected image, and calculating a difference value.

Step 4: Back-projection—processing iterative calculation of back-projection by the difference value.

Step 5: Correction—correcting the original three-dimensional spatial image reconstruction information by the difference between the values of the back-projection.

Step 6: Cycle—verifying the difference whether is less than a predetermined difference value (threshold) to decide to go around the steps or not. If not, then go back to the projection step; and if so, then go for the next set of three-dimensional spatial image reconstruction information starting with the steps of projection, comparison, backprojection and correction in sequence, until each direction of the three-dimensional reconstructed image completes the cycle, and the data error of three-dimensional image reconstruction is smaller than that of the predetermined value in the previous iteration.

Step 7: Image output—outputting the reconstructed image from all directions of the resulting simulated projection data to form a three-dimensional image volume.

Wherein the region of interest (ROI) is a sphere space.

Wherein the simplified data model is a cross-sectional image data.

Wherein the imaging system comprises a detector and an energy sources. The object is located between the imaging detector and the energy source.

Wherein the energy source is the light source, the radiation source, or non-radiation sources.

Wherein the comparison step uses a projection data center as an axis to rotate for the projection information and compare the three-dimensional spatial image reconstruction information.

Wherein the output image is either a three-dimensional or multi-dimensional tomographic image.

DETAILED DISCUSSION OF THE PREFERRED EMBODIMENTS

Figure 1:
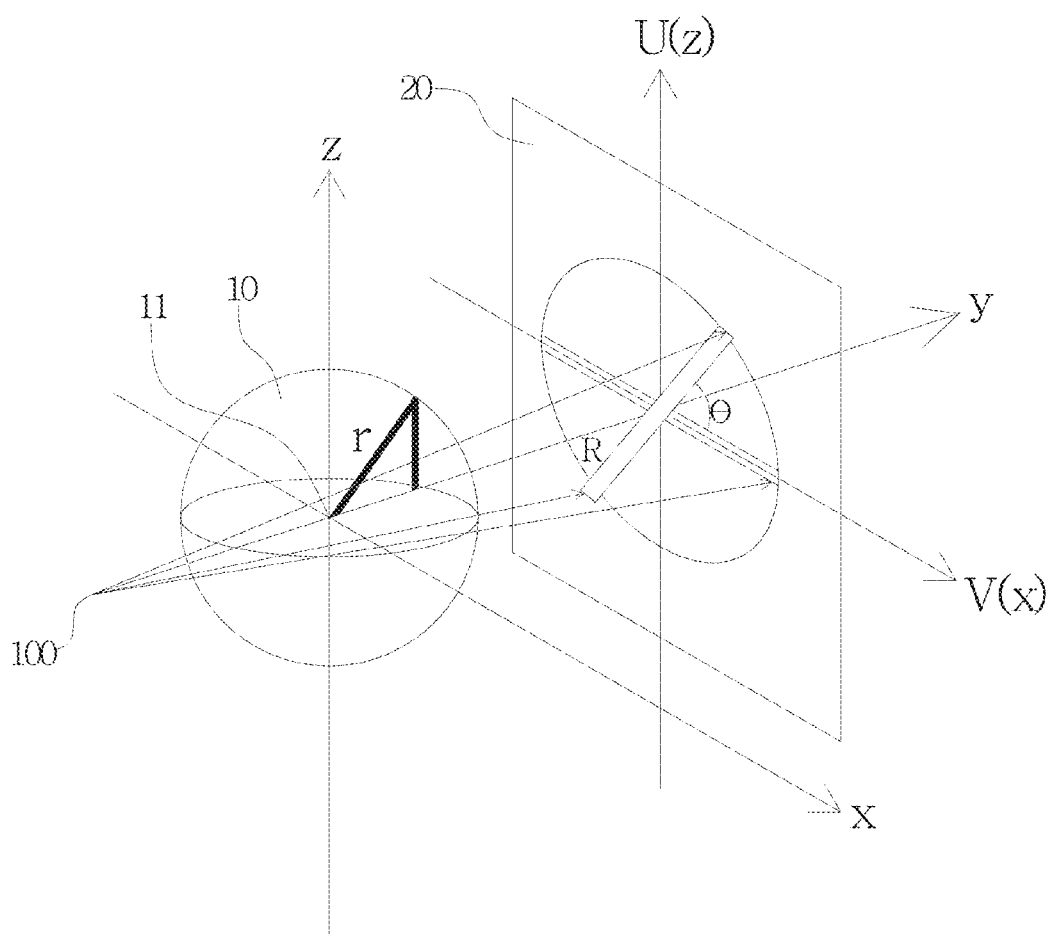
FIG. 1 shows a schematic diagram of the CT image reconstruction method in the present invention via an imaging system showing the projection information.

FIG. 1 shows a schematic diagram of the CT image reconstruction method in the present invention via an imaging system showing the projection information.

Please refer to FIG. 1. The imaging system includes an energy source 100 and an imaging detector 20; an object 10 is located between the energy source 100 and the imaging detector 20. The energy source 100 can serve as a light source, a radiation source, or a non-radiation source, generally X-ray. The object 10 can be an absorbent body or a damping body. Using the X-ray source as an example, the energy source 100 is projected toward the object 10. The detector 20 forms a projection data 21, assuming the object 10 is a spherical space.

Figure 2:
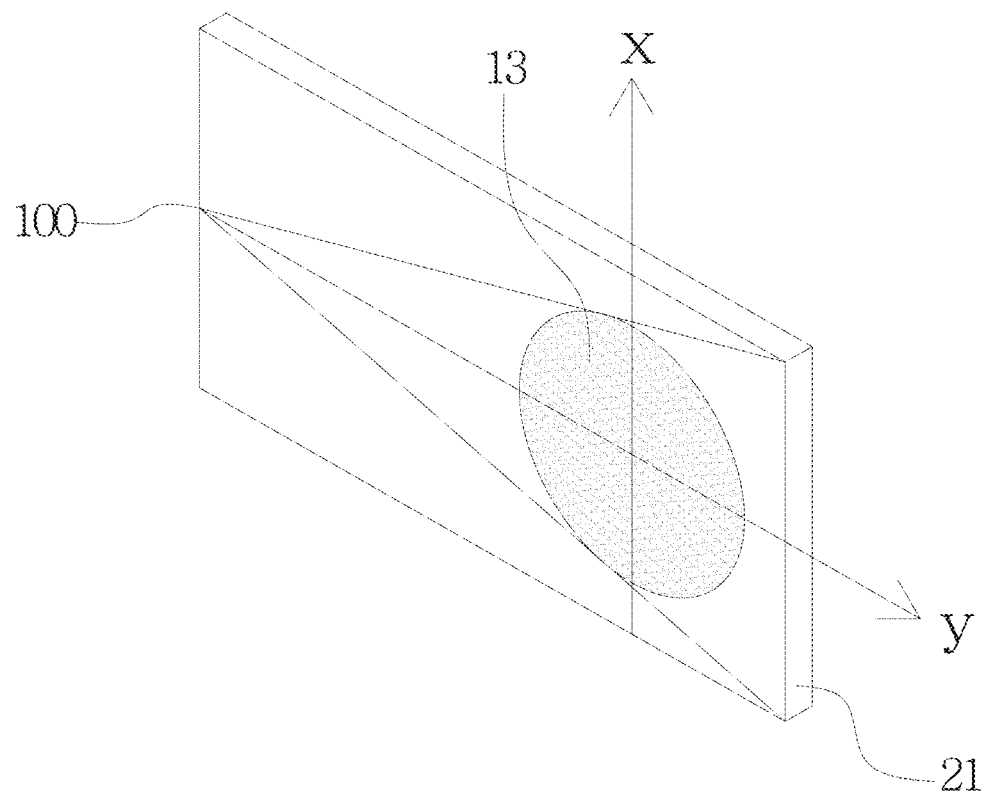
FIG. 2 shows a simplified two-dimensional schematic diagram of the computed tomography in the present invention.

FIG. 2 shows a simplified two-dimensional schematic diagram of the computed tomography in the present invention.

Please refer to FIG. 2. The three-dimensional structure of the object 10 can be simplified and repeated using a two-dimensional geometry structure. The body 10 of the reconstruction space utilizes the two-dimensional system matrix on the plane (two-dimensional) to form a cross-sectional circular area 13.

Figure 3:
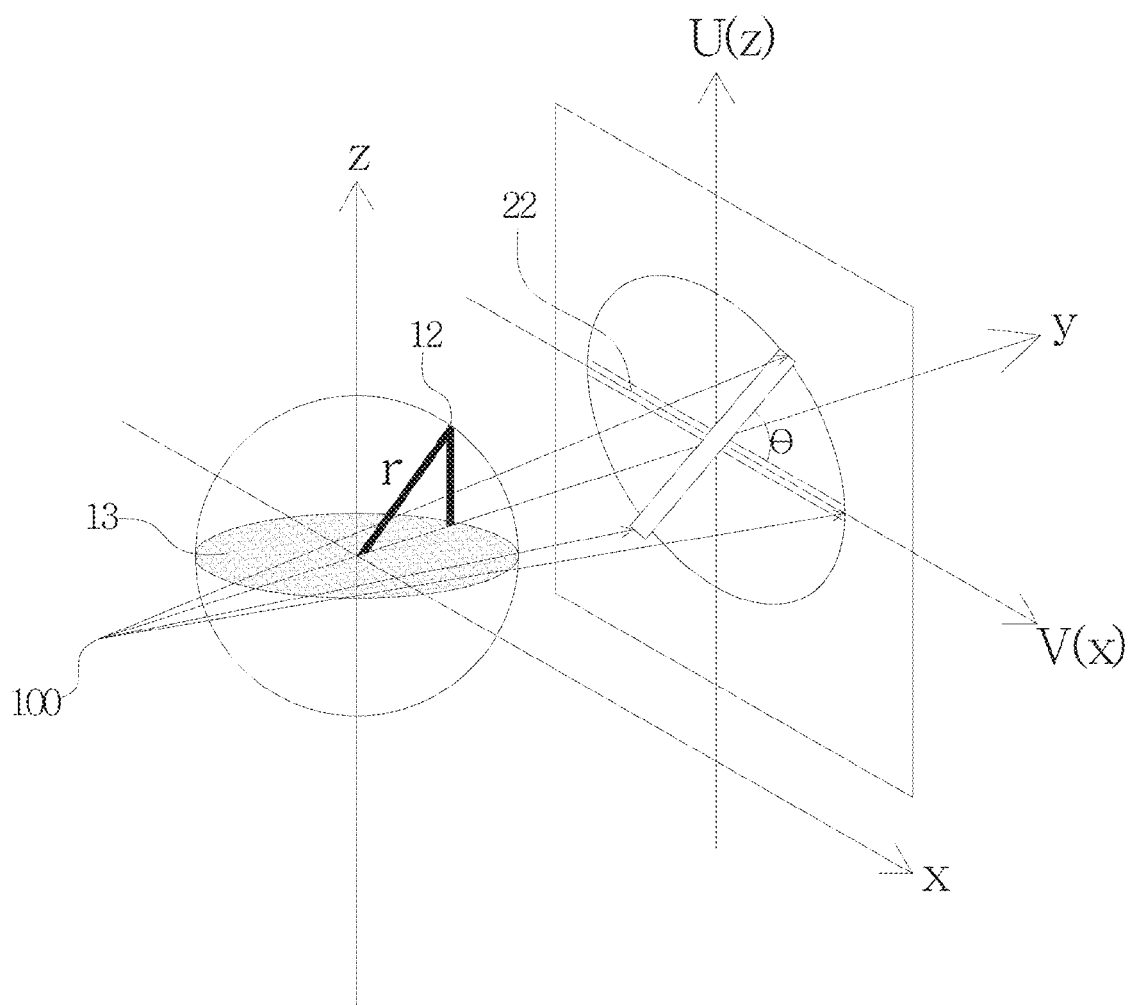
FIG. 3 shows a schematic diagram of CT image reconstruction method for projection, back projection and correction.

FIG. 3 shows a schematic diagram of CT image reconstruction method for projection, back projection and correction.

Please refer to FIG. 3. Through the cross-sectional circular area 13 for projection, it can produce a set of virtual projection data in the projection area 22. In addition, match the original projection data with the projection area 22. Then use the difference to carry out back projection and modify the data in a cross-sectional circular area 13.

Figure 4:
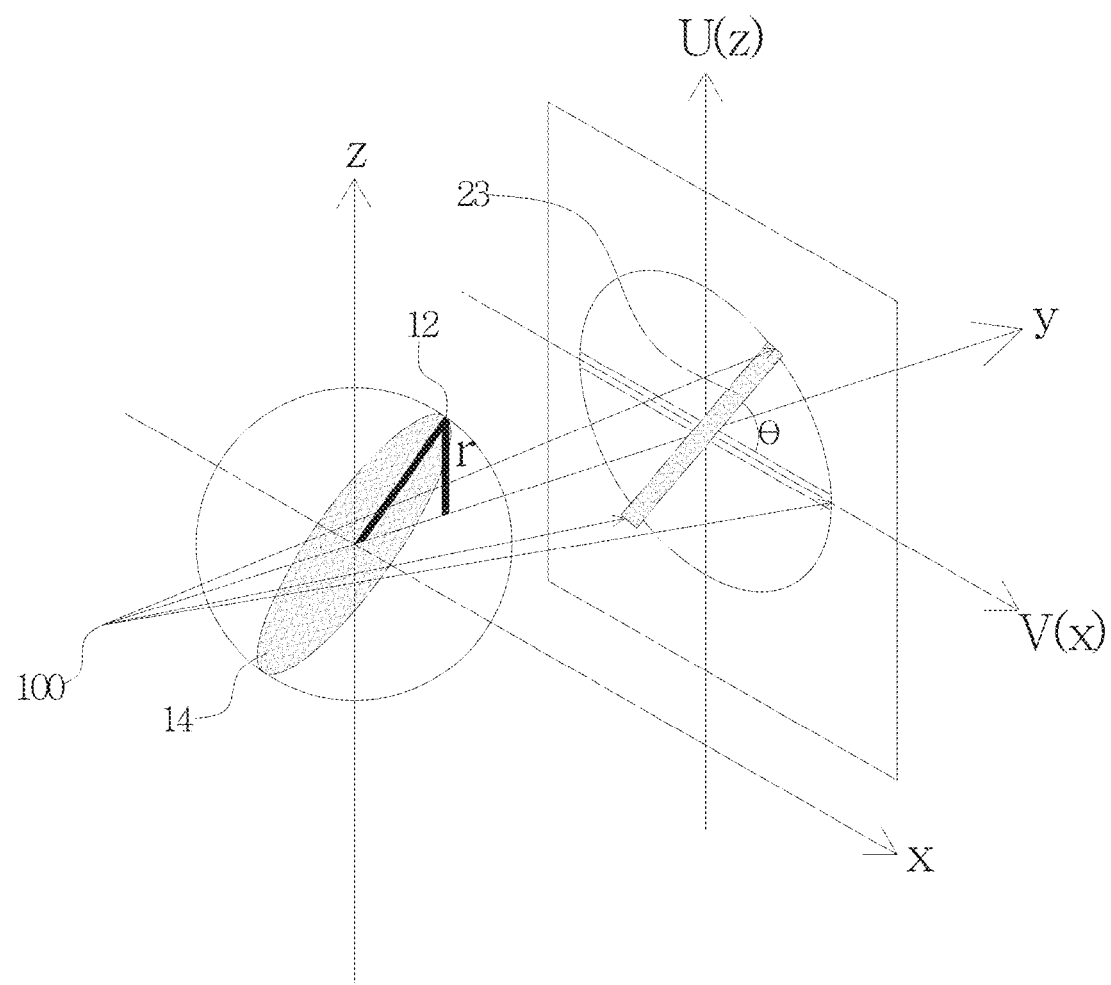
FIG. 4 shows a schematic diagram of the CT image reconstruction method in the present invention for the projection after rotating angle θ.

FIG. 4 shows a schematic diagram of the CT image reconstruction method in the present invention for the projection after rotating angle θ.

When the above processes have been completed, use the same two-dimensional system matrix to continue for another set of data as a projection center (i.e. y-axis). The data is obtained after the rotation angle θ 14. Proceed to do the projection and its corresponding data 23. Repeat the iterative correction, until the completion of the projection data 21 for all the data.

Figure 5:
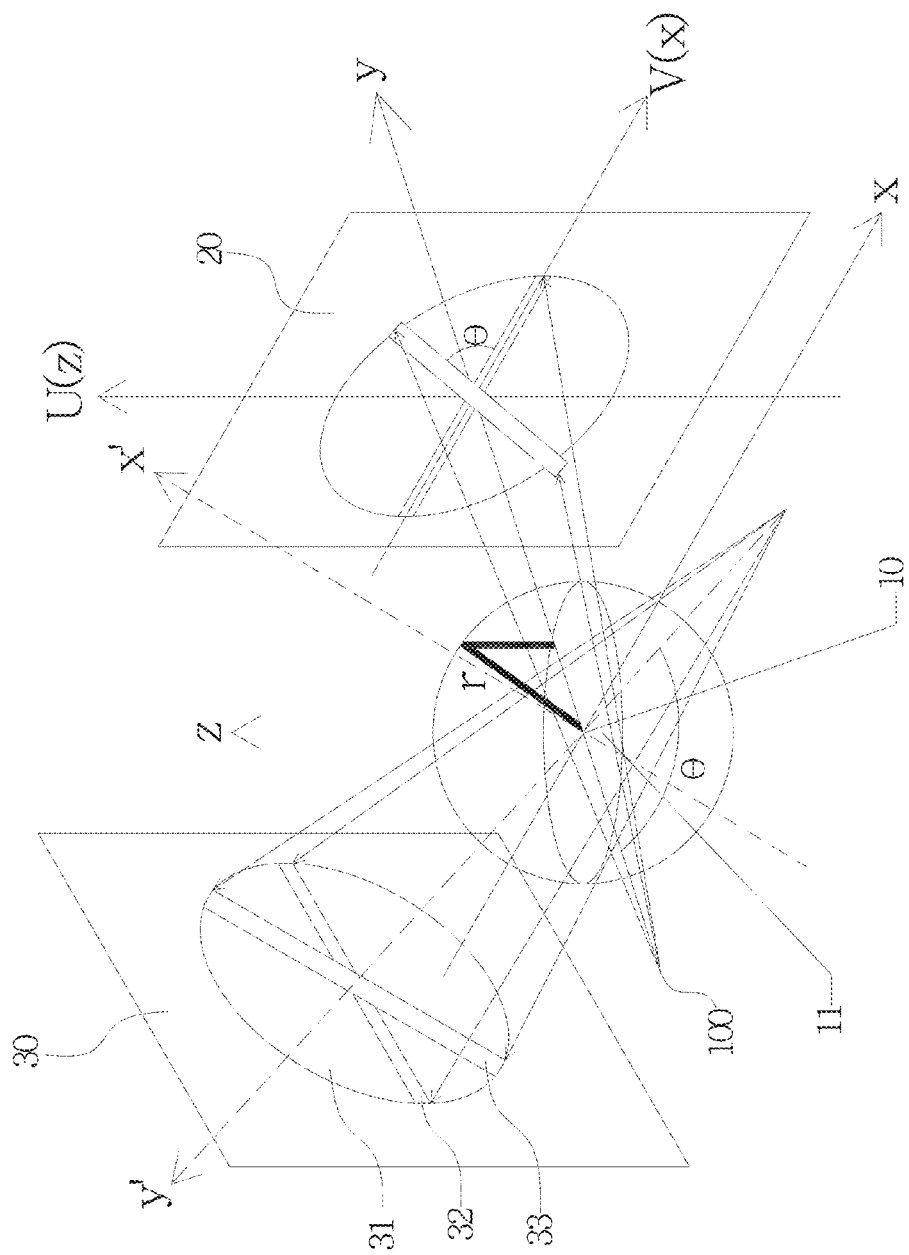
FIG. 5 shows a schematic diagram of the CT image reconstruction methods at different angles φ in the present invention.

FIG. 5 shows a schematic diagram of the CT image reconstruction methods at different angles φ in the present invention.

At different angles φ, the imaging detector 20 is located in the position 30 and its projection data 31 corresponding to areas 32 and According to the foregoing repeated steps using the same two-dimensional system in different directions, wait until all the information of the error values are smaller than predetermined error values, then output data to display a three-dimensional or multi-dimensional tomographic image.

Figure 6:
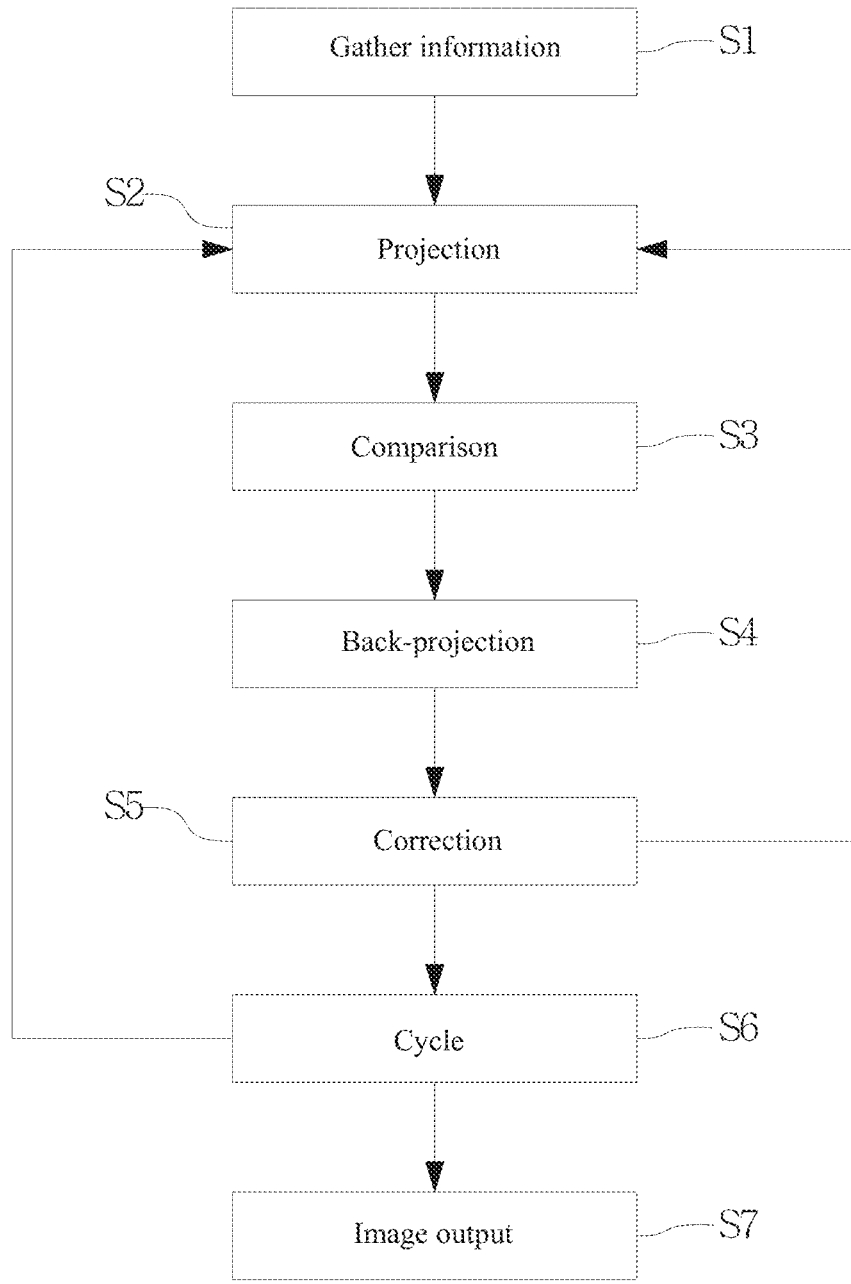
FIG. 6 shows a flowchart of the CT image reconstruction in the present invention.

FIG. 6 shows a flowchart of the CT image reconstruction in the present invention.

Please refer to FIG. 6. The present invention is the computed tomography image reconstruction method described as follows.

Gather information S1: an imaging system goes around an object 10 every predetermined angle. Use the object 10 as a center for the collection of the different orientations corresponding to a projection of the data 21, and the data 21 are recorded into geometric parameters of the imaging projection system. The directions of the geometric parameters of the system are created as a set of three-dimensional spatial image reconstruction information.

Figure 7:
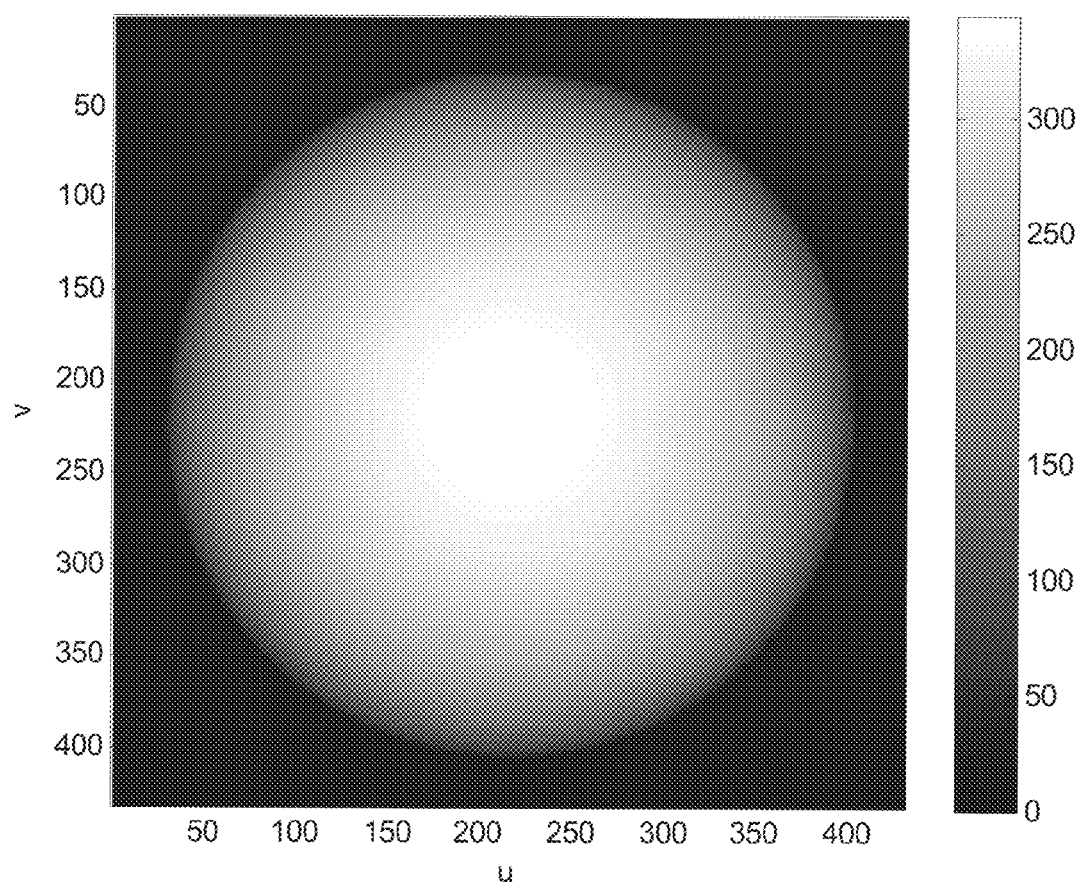
FIG. 7 shows a set of data on a region of interest (ROI) as a forecast data in the present invention.
Figure 8:
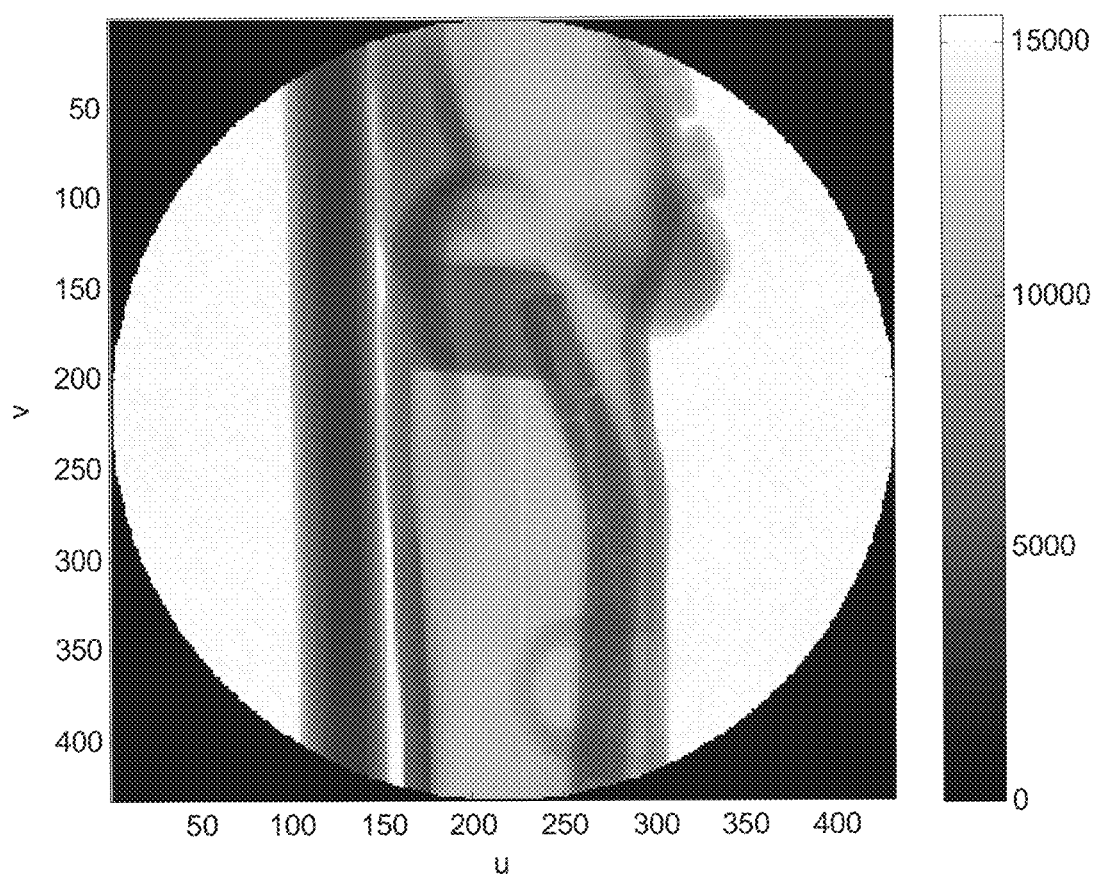
FIG. 8 shows the data of the region of interest (ROI) inputted through the simplified data model (two-dimensional system matrix) to simulate the projections in the present invention.

Projection S2: build the imaging system of the virtual data model and simplify its three-dimensional characteristics into a simplified data model (two-dimensional system matrix). Furthermore, virtualize a set of data on a region of interest (ROI) as a forecast data (as shown in FIG. 7), and finally input the data of the region of interest (ROI) through the simplified data model (two-dimensional system matrix) to simulate the projections (as shown in FIG. 8).

Comparison S3: compare and match the simulation projection information with the collected information on each angle of the projected image, and calculate a difference value.

Back-projection S4: the difference value above goes through the simplified data model (two-dimensional system matrix) to proceed to do iterative calculation of back-projection.

Correction S5: According to the difference value above, correct the difference of image.

Cycle S6: verify the difference value whether is less than the predetermined value. If not, then go back to the projection step; and if so, then go to the next set of three-dimensional spatial image reconstruction information starting the steps of projection, comparison, back-projection and correction in sequence, until each direction of the three-dimensional spatial image reconstruction information completes the cycle, and the data of the set of three-dimensional image reconstruction space is smaller than the difference of the predetermined value in the previous iteration.

Image output S7: The final output from all directions of the resulting simulated projection data forms a three-dimensional imaging reconstruction image.

Wherein the region of interest (ROI) is a spherical space. Simplified data model is a cross-sectional circular data 13. The comparison step uses a projection data center (such as Y-axis) as an axis to rotate for the projection information and match the three-dimensional spatial image reconstruction information.

Figure 9:
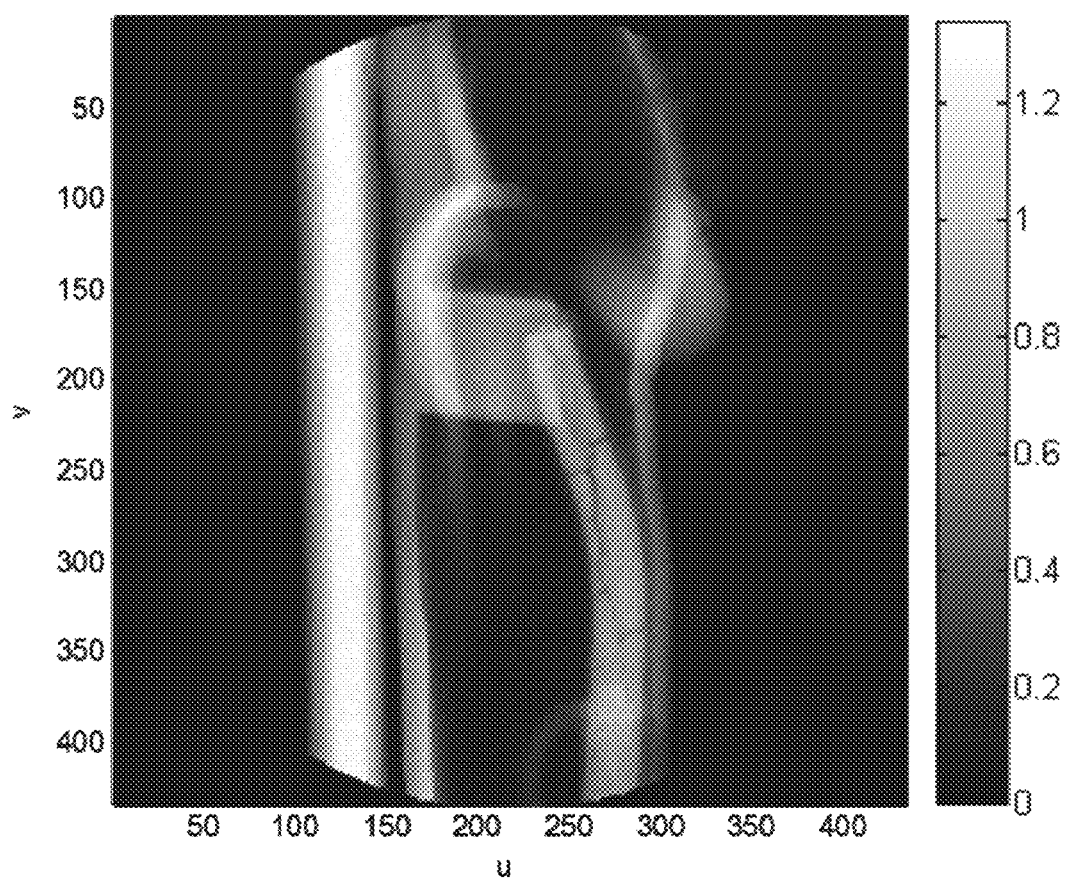
FIG. 9 shows the projection data received in the present invention according to physical characteristics converting into minus log map.

FIG. 9 shows the projection data received in the present invention according to physical characteristics converting into minus log map.

Figure 10:
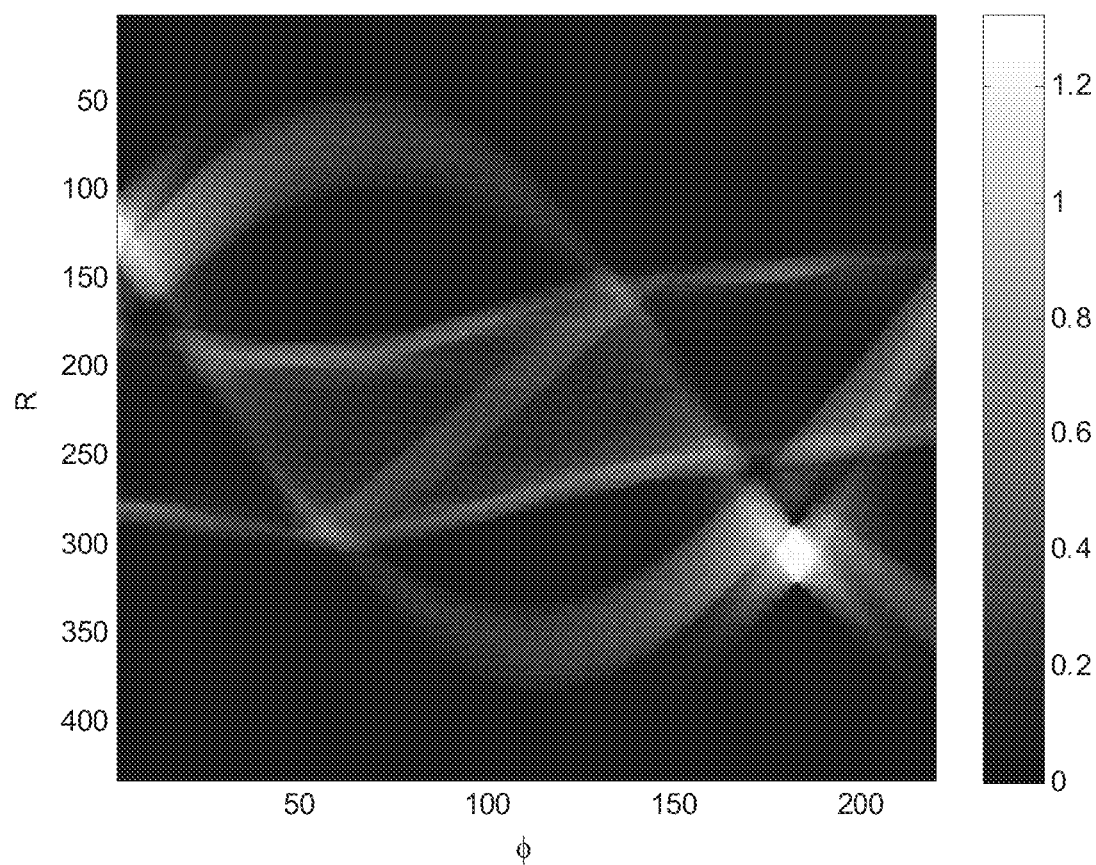
FIG. 10 shows a three-dimensional sinogram of the present invention, which is an object decaying diagram of all directions.

FIG. 10 is a three-dimensional sinogram in the present invention, which is an object decaying diagram of all directions. In accordance to the present invention, it is a figure stacked sequentially with different angles φ.

Figure 11:
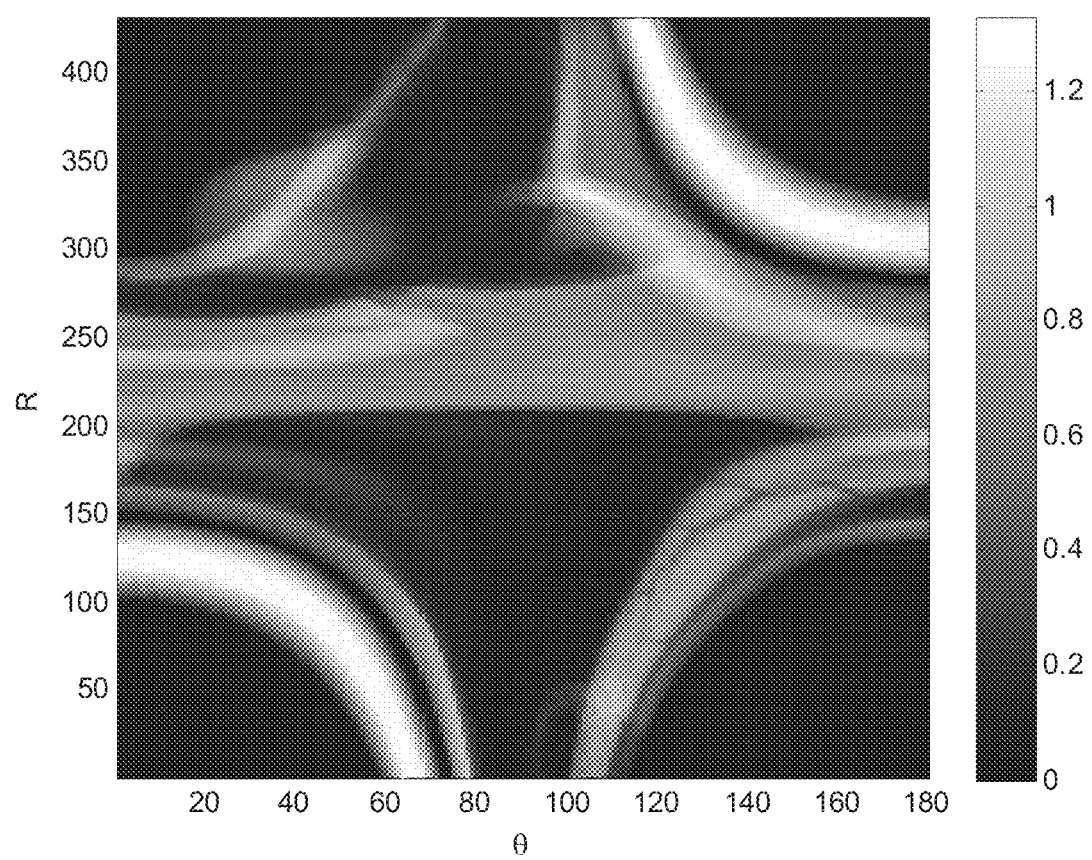
FIG. 11 shows the multi-direction data via the present invention to simplify the information of one projection data (projenogram).

FIG. 11 shows the multi-direction data via the present invention to simplify the information of one projection data (projenogram).

Please refer to FIG. 11. The object coordinate system of the decaying diagram (u, v) can be converted into the polar coordinates (R, θ). Through two-dimensional system matrix calculated value each time, the projection of the imaging detector 20 can be matched via the collected data for comparison.

In addition, if the information in accordance with the direction backfill to the imaging detector 20 located in the plane, then the system will restore the original image projection, as shown in FIG. 9.

Therefore, according to the method described above, it can effectively reduce the conventional three-dimensional or multi-dimensional imaging, which requires a massive reconstruction system matrix operation. The present invention uses only two-dimensional cross-sectional plane array data (two-dimensional system matrix) to build part of the system matrix to replace the conventional three-dimensional or multi-dimensional imaging system matrix. Through its spherical coordinates of the symmetry properties, it reduces memory usage and achieves the effect of reducing the amount of computation.

All of the features disclosed in this specification may be combined in any combination. Each feature disclosed in this specification may be replaced by an alternative feature serving the same, equivalent, or similar purpose. Thus, unless expressly stated; otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A computed tomography (CT) image reconstruction method, comprising the steps of:

Collecting all the different orientations corresponding to a projection of the data by using a center line, between central of detector and ray source, when an imaging system goes around an object every predetermined angle, and the data are recorded into geometric parameters of the imaging projection system, then the directions of the geometric parameters of the system are created as a set of three-dimensional spatial image reconstruction information;

Building the imaging system of the virtual data model and simplify its three-dimensional characteristics into a simplified data model, and virtualize a set of data in a region of interest (ROI) as a forecast data, and finally input the data of the region of interest (ROI) through the simplified data model to simulate the projections;

Comparing and matching the simulation projection information with the collected information on each angle of the projected image, and calculating a difference value;

Processing iterative calculation of back-projection by the difference value;

Correcting the original three-dimensional image reconstruction information by the difference between the values of the back-projection;

Verifying the difference value whether is less than a predetermined difference value to decide to run the steps to begin or not; and Outputting the reconstructed image from all directions of the resulting simulated projection data to form a three-dimensional imaging volume.

2. The method of the claim 1, wherein the region of interest (ROI) is a spherical space.

3. The method of the claim 2, wherein the simplified data model is the cross-sectional image data.

4. The method of the claim 1, wherein the imaging system is an imaging detector and an energy sources; and the object is located between the imaging detector and the energy source.

5. The method of the claim 4, wherein the energy source is the light source, the radiation source, or non-radiation sources.

6. The method of the claim 1, wherein the matching step adapts a projection data center as an axis to rotate for simulated projection information and comparison the set of three-dimensional spatial image reconstruction information.

7. The method of the claim 1, wherein the output images in the output step are three-dimensional or multi-dimensional tomographic images.

* * * * *